(12) United States Patent
Yeo et al.

(10) Patent No.: US 12,101,517 B1
(45) Date of Patent: Sep. 24, 2024

(54) METHOD AND APPARATUS FOR PROVIDING INFORMATION OF MULTIPLE PPL PRODUCTS IN SYNCHRONIZATION WITH THE MEDIA BEING PLAYED WHILE PROVING THE UNIQUENESS OF THE ORIGINAL PPL PRODUCT IN A COMMUNICATION SYSTEM

(71) Applicants: Tae Hwan Yeo, Seoul (KR); Bong Sup Lee, Seoul (KR)

(72) Inventors: Tae Hwan Yeo, Seoul (KR); Bong Sup Lee, Seoul (KR)

( * ) Notice: Subject to any disclaimer, the term of this patent is extended or adjusted under 35 U.S.C. 154(b) by 0 days.

(21) Appl. No.: 18/613,583

(22) Filed: Mar. 22, 2024

Related U.S. Application Data

(63) Continuation of application No. PCT/KR2022/014093, filed on Sep. 21, 2022.

(30) Foreign Application Priority Data

Sep. 23, 2021 (KR) .................. 10-2021-0125700

(51) Int. Cl.
*H04N 21/478* (2011.01)
*G06Q 30/0241* (2023.01)
(Continued)

(52) U.S. Cl.
CPC ... *H04N 21/23424* (2013.01); *G06Q 30/0276* (2013.01); *H04N 21/47815* (2013.01); *H04N 21/812* (2013.01)

(58) Field of Classification Search
CPC .............................................. H04N 21/47815
See application file for complete search history.

(56) References Cited

U.S. PATENT DOCUMENTS

2021/0279305 A1* 9/2021 Goldston ................ G06F 16/41
2022/0319173 A1* 10/2022 Ricciardi ............... G06V 20/46

FOREIGN PATENT DOCUMENTS

KR 1020150113351 A 10/2015
KR 1020170059260 A 5/2017
(Continued)

OTHER PUBLICATIONS

Office Action issued in corresponding KR Application 10-2021-0125700, issued May 16, 2022, and an English Translation, 12 pages.

(Continued)

*Primary Examiner* — Michael H Hong
(74) *Attorney, Agent, or Firm* — Burris Law, PLLC

(57) ABSTRACT

The present invention relates to a method and apparatus by which a communication system verifies uniqueness of an original PPL product and provides same in synchronization with media reproducing information on a plurality of PPL products. In particular, the present invention relates to a method and apparatus by which a communication system shares, on a blockchain network, an image containing digital tag information and a serial number photographed while content is produced, so as to verify uniqueness of an original PPL product, transmits, to a terminal of a user, information on a plurality of PPL products according to a playback time when a PPL product appears, in synchronization with the playback time of the content, and provides a purchase procedure.

7 Claims, 15 Drawing Sheets

(51) Int. Cl.
*H04N 21/234* (2011.01)
*H04N 21/81* (2011.01)

(56) References Cited

FOREIGN PATENT DOCUMENTS

| | | |
|---|---|---|
| KR | 1020170131151 A | 11/2017 |
| KR | 1020180058566 A | 6/2018 |
| KR | 1020180069356 A | 6/2018 |
| KR | 101895214 B1 | 9/2018 |
| KR | 1020210063730 A | 6/2021 |
| KR | 102439343 B1 | 9/2022 |

OTHER PUBLICATIONS

Notice of Allowance issued in corresponding KR Application 10-2021-0125700, issued Aug. 11, 2022, and an English Translation, 4 pages.
International Search Report and English Translation issued in PCT/KR2022/014093 mailed Dec. 29, 2022, 6 pages.

* cited by examiner

METHOD AND APPARATUS FOR PROVIDING INFORMATION OF MULTIPLE PPL PRODUCTS IN SYNCHRONIZATION WITH THE MEDIA BEING PLAYED WHILE PROVING THE UNIQUENESS OF THE ORIGINAL PPL PRODUCT IN A COMMUNICATION SYSTEM

CROSS-REFERENCE TO RELATED APPLICATIONS

This application is a continuation of International Application No. PCT/KR2022/014093, filed on Sep. 21, 2022, which claims priority to and the benefit of Korean Patent Application No. 10-2021-0125700, filed on Sep. 23, 2021. The disclosures of the above applications are incorporated herein by reference.

FIELD

The present invention relates to a method and apparatus which verify uniqueness of an original product placement (PPL) product and provide the same in synchronization with media reproducing information on a plurality of PPL products in a communication system. More particularly, the present invention relates to a method and apparatus which share, on a blockchain network, an image containing digital tag information and a serial number photographed while content is produced so as to verify uniqueness of an original PPL product, transmit, to a terminal of a user, information on a plurality of PPL products in synchronization with a playback time of the content according to the playback time when a PPL product appears, and provide a purchase procedure in a communication system.

BACKGROUND

The statements in this section merely provide background information related to the present disclosure and may not constitute prior art.

Recently, with the development of communication technology, as services, such as internet protocol television (IPTV), video on demand (VOD), and over the top (OTT), have become popular, consumption of media content based on platforms that allow viewers to view programs the viewers want at the time the viewers want is increasing significantly.

With the expansion of a media market, an advertising market using media content is also expanding. Indirect advertising, that is, product placement (PPL), is also becoming more active in the most representative advertising form using the media content. The PPL refers to an advertising technique that inserts specific company's products as props into media content such as movies or dramas in exchange for the specific company's sponsorship. By placing companies' products on a screen of media content in which viewers are immersed, the companies may plant product images in consumers' subconscious, so the companies can make consumers naturally perceive their product images without resistance and media content producers can cover production costs.

However, the PPL does not naturally expose PPL products as props in some media content, but rather excessively directs viewers to focus on the PPL products in a specific scene, resulting in the appearance of PPL products that do not fit the situation. Therefore, there is an adverse effect of viewers becoming less immersed in media content and becoming hostile toward the PPL products as soon as they recognize advertising.

In addition, since the PPL should draw viewers' attention to the PPL products in directing, the PPL has the limitation of advertising only a limited number of products in one scene. That is, if possible, sponsors would like to separately advertise a plurality of products that appear in the same scene of media content, but due to the limitations of directing, the number of products that may focus the spotlight per scene is limited.

In addition, the PPL may stimulate viewers' desire to purchase, but there is a problem that makes it difficult for viewers to know who a producer/seller of an original PPL product worn by an actor in the scene is. With the development of Internet search systems and shopping systems, a viewer can obtain product information by referring to a specific scene of the media content directly through the Internet, but requires considerable effort and time. Above all, since there are many imitation products, it is difficult for the viewer to know who the producer/seller of the original PPL product is. Accordingly, there is a problem in that advertising effect is reduced since the viewers' desire to purchase due to the exposure of PPL in the media content disappears during the search effort and does not lead to actual purchase.

A blockchain technology, which has recently been attracting attention, is a distributed data storage technology that stores data in blocks online and replicates and stores the data simultaneously on multiple computers connected in a chain form. Since the blockchain technology discloses transaction details to all users and allows all transaction participants to share information whenever the transaction occurs, data cannot be forged or falsified. In addition, an NFT, which has recently been attracting attention, means a non-fungible token. The NFT may assign a separate, unique recognition value to digital assets, so these digital assets may have scarcity and information such as ownership and sales history may be stored on the blockchain.

When an image that may verify information on an original PPL product photographed at the time of the media content production, for example, an image containing a serial number of the original PPL product, digital tag information, an image worn by an actor, location information of a photographing site, and photographing date and time information are shared with a blockchain node as a digital asset using the blockchain and NFT technology, the uniqueness of the original PPL product may be verified without the possibility of forgery or falsification. Based on the uniqueness of the original PPL product, when detailed product information and sales channel information on the PPL product of the same model as the original PPL product are provided as pop-up information to terminals such as a smartphone in synchronization with a playback time of the media content, as soon as a viewer has a desire to purchase while viewing the media content, the viewer may access the verified producer/seller channel of the original PPL product. In addition, when the information on the PPL product is organized and provided to the terminal, consumers may naturally be exposed to the information on the corresponding PPL product even if the PPL product is not emphasized excessively in the directing, so it is possible to solve the problem of hindering immersion in dramas due to the excessive production of the PPL. In addition, when the information on the PPL product is organized and provided to the terminal, there is no need to excessively emphasize the PPL product in the directing, so a plurality of PPL products may be advertised simultaneously in one scene, thereby increasing advertising efficiency. In addition, when the image that may verify the information on the original PPL product is uploaded to the blockchain network in the form of the NFT and then the ownership of the original PPL product matches the ownership of the NFT, the ownership of the NFT is also transferred when the ownership of the original PPL product is transferred and the ownership transfer information is shared with the blockchain nodes, so the ownership of the original PPL product, which is a personal property, may be verified with public confidence and trust may be prevented from being damaged due to the imitation product.

Accordingly, there is a need for a method and apparatus which verify uniqueness of an original PPL product and provide the same in synchronization with media reproducing information on a PPL product in a communication system.

SUMMARY

This section provides a general summary of the disclosure and is not a comprehensive disclosure of its full scope or all of its features.

The present invention aims to solve the following problems in order to solve the above-described problems.

The present invention provides a method and apparatus which verify uniqueness of an original product placement (PPL) product and provide the same in synchronization with media reproducing information on a plurality of PPL products in a communication system.

The present invention also provides a method and apparatus which share, on a blockchain network, an image containing digital tag information and a serial number photographed while content is produced so as to verify uniqueness of an original PPL product, transmit, to a terminal of a user, information on a plurality of PPL products in synchronization with the playback time of the content according to a playback time when a PPL product appears, and provide a purchase procedure in a communication system.

The present invention also provides a method and apparatus capable of solving the problem of hindering immersion in a drama due to excessive directing of PPL by organizing information on a PPL product and providing the organized PPL product to a terminal.

The present invention also provides a method and apparatus capable of simultaneously advertising a plurality of PPL products in one scene by organizing information on a PPL product and providing the organized information to a terminal.

The present invention also provides a method and apparatus capable of verifying ownership of an original PPL product, which is a personal property, with public trust and preventing trust from being damaged due to an imitation product by uploading an image, which may verify information on the original PPL product, to a blockchain network in the form of a non-fungible token (NFT) and then matching the ownership of the original PPL product to ownership of the NFT and transferring the ownership of the NFT when transferring the ownership of the original PPL product, and sharing the ownership transfer information with blockchain nodes.

The problems to be solved by the present invention are not limited to those described above, and other problems not described may be clearly understood by those skilled in the art from the description below.

According to various embodiments of the present invention, a method of operating a product placement (PPL) server in a communication system, the PPL server including a transceiver, a memory, and a processor, the method includes: receiving, by the transceiver, a plurality of pieces of first PPL information, wherein each of the plurality of pieces of first PPL information includes a manufacturer and product model information on a first PPL product, first content identification information on first content in which the first PPL product appears, first platform identification information on a first platform on which the first content is provided, and first playback time information for which the first PPL product appears within the first content; receiving, by the transceiver, viewing content information from a terminal, wherein the viewing content information includes second platform identification information on a platform of the second content being viewed, second content identification information on the second content, and a second playback time of the second content at a time when the terminal transmits the viewing content information; determining, by the processor, second PPL information with the first PPL information corresponding to the second platform identification information and the second content identification information among the plurality of pieces of first PPL information; determining, by the processor, a current playback time of the second content with a sum of a time elapsed from a time when the viewing content information is received and the second playback time; and transmitting, by the transceiver, the second PPL information to the terminal at a time when the current playback time corresponds to the first playback time information on the second content.

According to various embodiments of the present invention, there is provided a server in a communication system. The server includes a transceiver, a memory, and a processor, and the processor is configured to perform a method of operating a server in a communication system according to various embodiments of the present invention.

According to various embodiments of the present invention, there is provided a computer program recorded on a computer-readable storage medium. The computer program is configured to perform a method of operating a server in a communication system according to various embodiments of the present invention.

According to the present invention, it is possible to provide a method and apparatus which verify uniqueness of an original product placement (PPL) product and provide the same in synchronization with media reproducing information on a plurality of PPL products in a communication system.

According to the present invention, it is possible to provide a method and apparatus which share, on a blockchain network, an image containing digital tag information and a serial number photographed while content is produced so as to verify uniqueness of an original PPL product, transmit, to a terminal of a user, information on a plurality of PPL products in synchronization with the playback time of the content according to a playback time when a PPL product appears, and provide a purchase procedure in a communication system.

According to the present invention, it is possible to provide a method and apparatus capable of solving the problem of hindering immersion in a drama due to excessive directing of PPL by organizing information on a PPL product and providing the organized PPL product to a terminal.

According to the present invention, it is possible to provide a method and apparatus capable of simultaneously advertising a plurality of PPL products in one scene by organizing information on a PPL product and providing the organized information to a terminal.

According to the present invention, it is possible to provide a method and apparatus capable of verifying ownership of an original PPL product, which is a personal property, with public trust and preventing trust from being damaged due to an imitation product by uploading an image, which may verify information on the original PPL product, to a blockchain network in the form of a non-fungible token (NFT) and then matching the ownership of the original PPL product to ownership of the NFT and transferring the ownership of the NFT when transferring the ownership of the original PPL product, and sharing the ownership transfer information with blockchain nodes.

The effects of the present invention are not limited to those described above, and other effects not described may be clearly understood by those skilled in the art from the description below.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
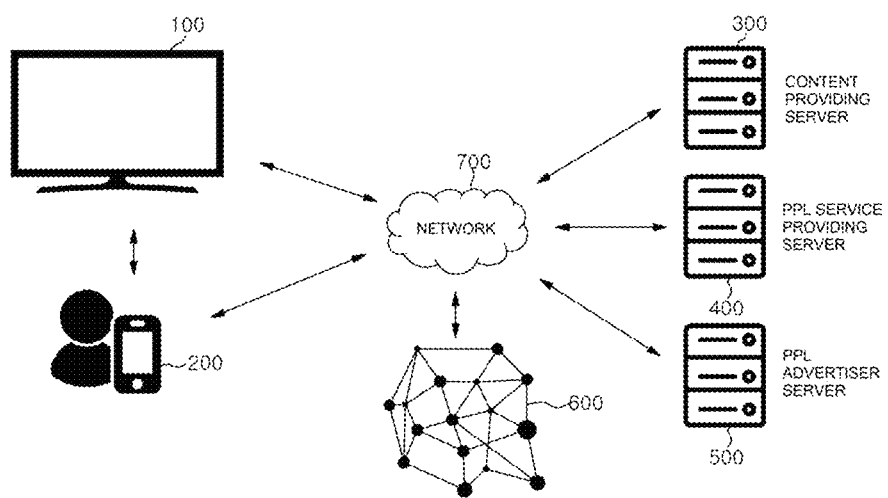
FIG. 1 is a diagram illustrating a communication system according to various embodiments of the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, embodiments of the present invention will be described in detail with reference to the accompanying drawings so that those skilled in the art may easily practice the present invention. The present invention may be implemented in various different forms and is not limited to embodiments described herein.

FIG. 1 is a diagram illustrating a communication system according to various embodiments of the present invention.

Referring to FIG. 1, a communication system according to various embodiments of the present invention includes a smart image device 100, a user terminal 200, a content providing server 300, a PPL service providing server 400, a PPL advertiser server 500, a blockchain network 600, and a wired/wireless communication network 700.

The smart image device 100 is an imaging apparatus operated by a user and is a smart apparatus that outputs platform-based media content as an image using a communication system. The smart image device 100 receives and outputs the media content from the content providing server 300 through the wired/wireless communication network 700, and may be controlled by the user terminal 200 connected through short-range communication to output the media content selected by the user terminal 200 to a platform app selected by the user terminal 200 at a playback time selected by the user terminal 200. The smart image device 100 may be an electronic device that includes an input device capable of inputting information, an output device capable of outputting information as video and audio, a memory capable of storing information, a transceiver capable of transmitting and receiving information, and at least one processor capable of performing a calculation on information, such as a smart television, a computer, a cellular phone, a smartphone, or a tablet computer capable of performing a transmitting and receiving function.

The user terminal 200 is a terminal operated by a user who views media content. The user terminal 200 is an electronic device that may control to output content to the smart image device 100 through the wired/wireless communication network 700, provide viewing content information to the PPL service providing server 400, receive information on PPL product from the PPL service providing server 400, output the information on the PPL product, and transmit a request to purchase the PPL product to the PPL service providing server 400. The user terminal 200 may be an electronic device that includes an input device capable of inputting information, an output device capable of outputting information, a memory capable of storing information, a transceiver capable of transmitting and receiving information, and at least one processor capable of performing a calculation on information, such as a computer, a cellular phone, a smartphone, or a tablet computer.

The content providing server 300 is a server operated by a media content service provider based on a platform such as internet protocol television (IPTV), video on demand (VOD), and over the top (OTT). The content providing server 300 is, for example, a server operated by an IPTV provider, a YouTube platform operator, a Netflix platform operator, or other IPTV, VOD, or OTT service providers. The content providing server 300 is an electronic device that may provide the media content to the smart image device 100 based on the content information received from the smart image device 100 through the wired/wireless communication network 700. The content providing server 300 may be an electronic device that includes a memory capable of storing information, a transceiver capable of transmitting and receiving information, and at least one processor capable of performing a calculation on information.

The PPL service providing server 400 is a server operated by the PPL service provider. The PPL service providing server 400 is an electronic device that may directly receive PPL content information from the PPL advertiser server 500 through the wired/wireless communication network 700 or may receive PPL content information in the form of block data that the PPL advertiser server 500 uploads to the blockchain network 600 through the blockchain network 600. Alternatively, the PPL service providing server 400 is an electronic device that may directly receive the PPL content information from the content providing server 300 through the wired/wireless communication network 700 or may receive the PPL content information in the form of the block data that the content providing server 300 uploads to the blockchain network 600 through the blockchain network 600. The PPL service providing server 400 may determine the PPL information to be transmitted to the user terminal 200 based on the viewing content information received from the user terminal 200, transmit the PPL information to the user terminal 200 according to the time when the PPL information appears among the content that the user is viewing, and perform a PPL product sales procedure based on a PPL product purchase request received from the user terminal 200. The PPL service providing server 400 may be an electronic device that includes a memory capable of storing information, a transceiver capable of transmitting and receiving information, and at least one processor capable of performing a calculation on information.

The PPL advertiser server 500 is a server operated by a PPL advertiser. The PPL advertiser is an advertiser that plans the PPL advertising within the media content provided by the content providing server 300 based on the platforms such as IPTV, VOD, and OTT. Since the PPL advertiser is linked to a manufacturer/seller of a PPL product and plan PPL advertising together with a media content producer, the PPL advertiser knows the PPL advertising information that includes detailed product information on the PPL product, sales information, information on a PPL scene in which the PPL product appears in the media content, etc. The PPL advertiser may directly provide the PPL advertising information to the PPL service provider or may provide the PPL advertising information to the media content platform operator, and then provide the PPL advertising information to the PPL service provider through the media content platform operator. In addition, the PPL advertiser may upload the PPL advertising information to the blockchain network, or the PPL advertising information that the PPL advertiser provides the media content platform operator may be uploaded to a blockchain network by the media content platform operator. The PPL advertiser server 500 is an electronic device that may directly transmit the PPL content information to the PPL service providing server 400 or the content providing server 300 through the wired/wireless communication network 700 or upload the PPL content information in the form of the block data to the blockchain network 600. The PPL advertiser server 500 may be an electronic device that includes a memory capable of storing information, a transceiver capable of transmitting and receiving information, and at least one processor capable of performing a calculation on information.

The blockchain network 600 refers to a plurality of nodes operating based on the blockchain technology. Here, the blockchain technology is a distributed storage technology that uses a storage structure where blocks are connected in a chain form to store data to be managed in a plurality of nodes that constitutes a blockchain network. The blockchain network 600 may store transactions transmitted from at least one of the nodes constituting the blockchain network, such as the PPL service providing server 400 and the PPL advertiser server 500, in a block form based on a predetermined consensus algorithm. Data stored in the block form may be shared by the plurality of nodes that constitute the blockchain network 600. Depending on the implementation type, the blockchain network 600 may include a public blockchain network in which arbitrary nodes may perform a consensus operation, or a private blockchain network in which only predetermined nodes may perform the consensus operation.

The consensus algorithm performed in the blockchain network 600 according to various embodiments of the present invention may include a proof of work (PoW) algorithm, a proof of Stake (PoS) algorithm, a delegated proof of stage (DPoS) algorithm, a practical Byzantine fault tolerance (PBFT) algorithm, a delegated Byzantine Fault Tolerance (DBFT) algorithm, a redundant Byzantine fault tolerance (RBFT) algorithm, a sieve algorithm, a tendermint algorithm, a Paxos algorithm, a Raft algorithm, a proof of authority (PoA) algorithm, and/or a proof of elapsed time (PoET) algorithm.

According to various embodiments of the present invention, the nodes in the blockchain network 600 may operate by a blockchain core package according to a hierarchical structure. The hierarchical structure may include a data layer that defines a structure of data handled in the blockchain network 600 and manages the data, a consensus layer that is responsible for verifying validity of blocks, performing mining to generate the blocks, and processing fees paid to miners during the mining process, an execution layer that processes and executes smart contract, a common layer that implements and manages P2P network protocol, a hash function, digital signature, encoding, and common storage, and an application layer where various applications are generated, processed, and managed.

The wired/wireless communication network 700 provides a communication path through which the smart image device 100, the user terminal 200, the content providing server 300, the PPL service providing server 400, the PPL advertiser server 500, and the blockchain network 600 may transmit and receives signals and data. The wired/wireless communication network 700 is not limited to a communication method according to a specific communication protocol, and an appropriate communication method may be used according to an implementation example. For example, when the wired/wireless communication network 700 is composed of a system based on the Internet Protocol (IP), the wired/wireless communication network 700 may be implemented as a wired or wireless Internet network, and the smart image device 100, the user terminal 200, the content providing server 300, the PPL service providing server 400, the PPL advertiser server 500, and the blockchain network 600 may be implemented as a wireless network such as a cellular network or a wireless local area network (WLAN).

Figure 2:
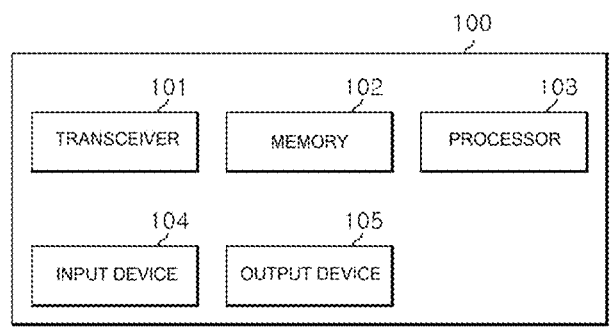
FIG. 2 is a block diagram illustrating a configuration of a smart video device according to various embodiments of the present invention.

FIG. 2 is a block diagram illustrating a configuration of a smart video device according to various embodiments of the present invention.

Referring to FIG. 2, the smart image device 100 according to various embodiments of the present invention includes a transceiver 101, a memory 102, a processor 103, an input device 104, and an output device 105.

The transceiver 101 is connected to the processor 103 and transmits and/or receives a signal. All or a part of the transceiver 101 may be referred to as a transmitter, a receiver, or a transceiver. The transceiver 101 may support at least one of various wireless communication standards, such as institute of electrical and electronics engineers (IEEE) 802.xx system, IEEE Wi-Fi system, $3^{rd}$ generation partnership project (3GPP) system, 3GPP long term evolution (LTE) system, 3GPP 5G new radio (NR) system, 3GPP2 system, and Bluetooth, which are wired access systems and wireless access systems.

The memory 102 is connected to the transceiver 101, the memory 102, the processor 103, the input device 104, and the output device 105, and may store the information input through the input device 104, the information received from at least one of the servers 300, 400, 500 through communication between the transceiver 101, etc. In addition, the memory 102 is connected to the processor 103, and may store data such as a default program for an operation of the processor 103, an application program, configuration information, and information generated by a calculation of the processor 103. The memory 102 may be composed of volatile memory, non-volatile memory, or a combination of volatile and non-volatile memory. Also, the memory 102 may provide stored data according to a request of the processor 103.

The processor 103 may be configured to implement procedures and/or methods proposed in the present invention. The processor 103 controls overall operations of the smart image device 100. For example, the processor 103 transmits or receives information or the like through the transceiver 101. In addition, the processor 103 writes and reads data in and from the memory 102. In addition, the processor 103 receives information through the input device 104. In addition, the processor 103 outputs the information through the output device 105. In addition, the processor 103 photographs images through the camera 160. The processor 103 may include at least one processor.

The input device 104 is connected to the processor 103 and may input information, etc. According to an embodiment, the input device 104 may input information or the like received from another device connected to the wired/wireless communication network 700 through the transceiver 101. The input device 104 may include a touch display, a keypad, a keyboard, etc.

The output device 105 is connected to the processor 103 and may output information or the like in the form of video/audio, etc. According to an embodiment, the output device 105 may output information or the like received from another device connected to the wired/wireless communication network 700 through the transceiver 101. The output device 105 may include a display, a speaker, etc.

Figure 3:
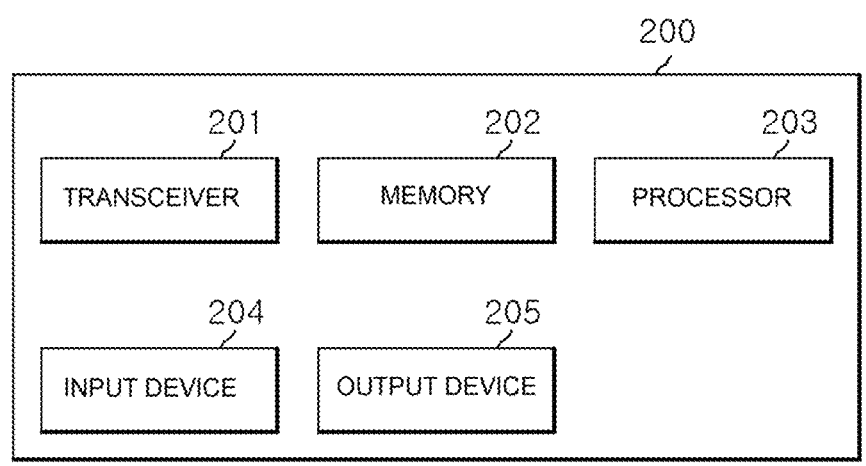
FIG. 3 is a block diagram illustrating a configuration of a user terminal according to various embodiments of the present invention.

FIG. 3 is a block diagram illustrating a configuration of a user terminal according to various embodiments of the present invention.

Referring to FIG. 3, the user terminal 200 according to various embodiments of the present invention includes a transceiver 201, a memory 202, a processor 203, an input device 204, and an output device 205.

The transceiver 201 is connected to the processor 203 and transmits and/or receives a signal. All or a part of the transceiver 201 may be referred to as a transmitter, a receiver, or a transceiver. The transceiver 201 may support at least one of various wireless communication standards, such as institute of electrical and electronics engineers (IEEE) 802.xx system, IEEE Wi-Fi system, $3^{rd}$ generation partnership project (3GPP) system, 3GPP long term evolution (LTE) system, 3GPP 5G new radio (NR) system, 3GPP2 system, and Bluetooth, which are wired access systems and wireless access systems.

The memory 202 is connected to the transceiver 201, the memory 202, the processor 203, the input device 204, and the output device 205, and may store the information input through the input device 204, the information received from at least one of the servers 300, 400, 500 through communication between the transceiver 201, etc. In addition, the memory 202 is connected to the processor 203, and may store data such as a default program for an operation of the processor 203, an application program, configuration information, and information generated by a calculation of the processor 203. The memory 202 may be composed of volatile memory, non-volatile memory, or a combination of volatile and non-volatile memory. Also, the memory 202 may provide stored data according to a request of the processor 203.

The processor 203 may be configured to implement procedures and/or methods proposed in the present invention. The processor 203 controls the overall operations of the user terminal 200. For example, the processor 203 transmits or receives information or the like through the transceiver 201. In addition, the processor 203 writes and reads data in and from the memory 202. In addition, the processor 203 receives information through the input device 204. In addition, the processor 203 outputs the information through the output device 205. In addition, the processor 203 photographs images through the camera 160. The processor 203 may include at least one processor.

The input device 204 is connected to the processor 203 and may input information, etc. According to an embodiment, the input device 204 may input information or the like received from another device connected to the wired/wireless communication network 700 through the transceiver 201. The input device 204 may include a touch display, a keypad, a keyboard, etc.

The output device 205 is connected to the processor 203 and may output information or the like in the form of video/audio, etc. According to an embodiment, the output device 205 may output information or the like received from another device connected to the wired/wireless communication network 700 through the transceiver 201. The output device 205 may include a display, a speaker, etc.

Figure 4:
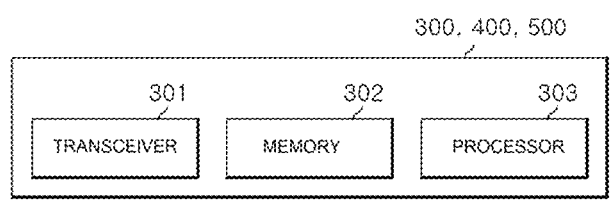
FIG. 4 is a block diagram illustrating configurations of a content providing server, a product placement (PPL) service providing server, and a PPL advertiser server according to various embodiments of the present invention.

FIG. 4 is a block diagram illustrating configurations of the content providing server, the PPL service providing server, and the PPL advertiser server according to various embodiments of the present invention.

Referring to FIG. 4, the content providing server 300, the PPL service providing server 400, and the PPL advertiser server 500 according to various embodiments of the present invention include a transceiver 301, a memory 302, and a processor 303.

The transceiver 301 is connected to the processor 303 and transmits and/or receives a signal. All or a part of the transceiver 301 may be referred to as a transmitter, a receiver, or a transceiver. The transceiver 301 may support at least one of various wireless communication standards, such as institute of electrical and electronics engineers (IEEE) 802.xx system, IEEE Wi-Fi system, $3^{rd}$ generation partnership project (3GPP) system, 3GPP long term evolution (LTE) system, 3GPP 5G new radio (NR) system, 3GPP2 system, and Bluetooth, which are wired access systems and wireless access systems.

The memory 302 is connected to the transceiver 220, and may store the information received from the user terminal 200 or at least one other server 300, 400, 500 through the communication of the transceiver 220. In addition, the memory 302 is connected to the processor 303, and may store data such as a default program for an operation of the processor 303, an application program, configuration information, and information generated by a calculation of the processor 303. The memory 302 may be composed of volatile memory, non-volatile memory, or a combination of volatile and non-volatile memory. Also, the memory 302 may provide stored data according to a request of the processor 303.

The processor 303 may be configured to implement procedures and/or methods proposed in the present invention. The processor 303 controls the overall operations of the content providing server 300, the PPL service providing server 400, and the PPL advertiser server 500. For example, the processor 303 transmits or receives information or the like through the transceiver 301. In addition, the processor 303 writes and reads data in and from the memory 302. The processor 303 may include at least one processor.

Figure 5:
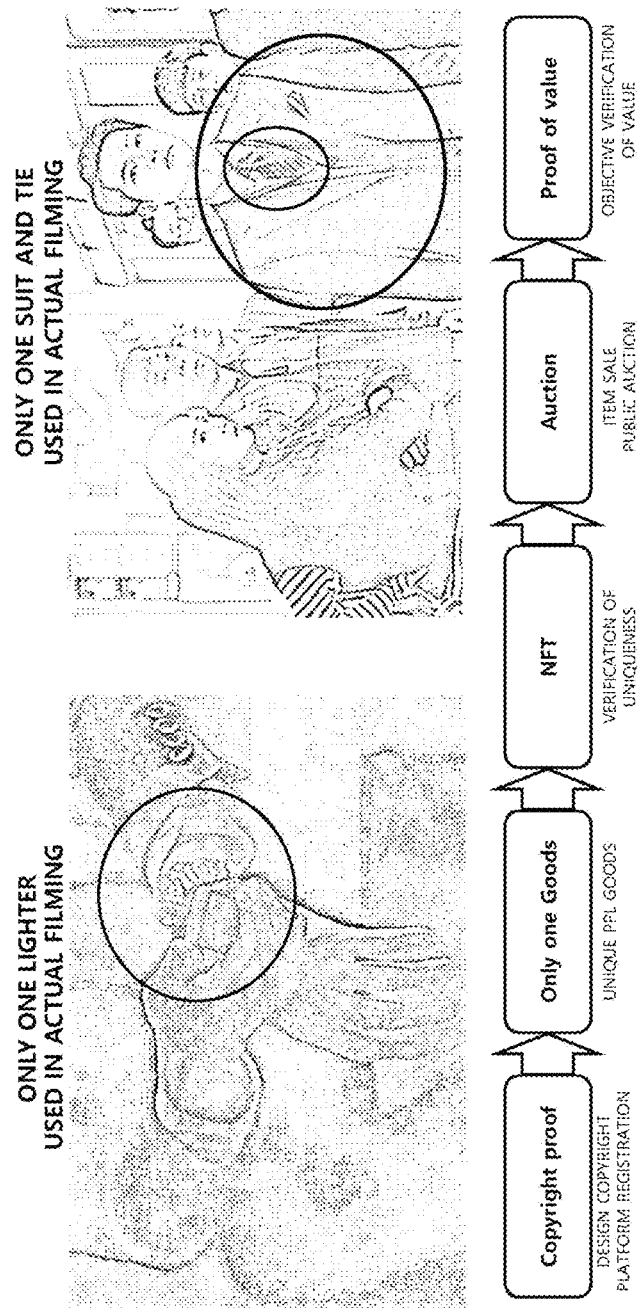
FIG. 5 is a diagram illustrating an example of a method of verifying uniqueness of an original PPL product in a communication system according to various embodiments of the present invention.

FIG. 5 is a diagram illustrating an example of a method of verifying uniqueness of an original PPL product in a communication system according to various embodiments of the present invention.

According to various embodiments of the present invention, it is possible to verify the uniqueness of the original PPL product actually used for photographing within the media content.

When an image that may verify information on an original PPL product photographed at the time of the media content production, for example, an image containing a serial number of the original PPL product, digital tag information, an image worn by an actor, location information of a photographing site, and photographing date and time information are shared with a blockchain node as a digital asset using the blockchain and NFT technology, the uniqueness of the original PPL product may be verified without the possibility of forgery or falsification. Based on the uniqueness of the original PPL product, when detailed product information and sales channel information on the PPL product of the same model as the original PPL product are provided as pop-up information to terminals such as a smartphone in synchronization with a playback time of the media content, the viewers may access the verified producer/seller channel of the original PPL product as soon as they have a desire to purchase while viewing the media content. In addition, when the information on the PPL product is organized and provided to the terminal, consumers may naturally be exposed to the information on the corresponding PPL product even if the PPL product is not emphasized excessively in the directing, so it is possible to solve the problem of hindering immersion in dramas due to the excessive production of the PPL. In addition, when the information on the PPL product is organized and provided to the terminal, there is no need to excessively emphasize the PPL product in the directing, so a plurality of PPL products may be advertised simultaneously in one scene, thereby increasing advertising efficiency. In addition, when the image that may verify the information on the original PPL product is uploaded to the blockchain network in the form of the NFT and then the ownership of the original PPL product matches the ownership of the NFT, the ownership of the NFT is also transferred when the ownership of the original PPL product is transferred and the ownership transfer information is shared with the blockchain nodes, so the ownership of the original PPL product, which is a personal property, may be verified with public confidence and trust may be prevented from being damaged due to the imitation product.

According to various embodiments of the present invention, the information on the PPL product that the user terminal 200 outputs may include the information on the manufacturer and product model of the PPL product. According to various embodiments of the present invention, the information on the PPL product that the user terminal 200 outputs may include a first image photographed during production of media content for a PPL scene in which an actor and a PPL product appears in the media content being reproduced on the smart image device 100 and a second image photographed at a production site of the media content being reproduced for a serial number of an original PPL product photographed with the actor in the PPL scene, in which the first image and the second image may include location tag information on the same area and photographing time tag information in an adjacent time zone on the same date. According to various embodiments of the present invention, the second image may include an image of a digital tag coupled to the original PPL product along with the image of the serial number, and the digital tag is based on a short-range wireless communication technology, and the short-range wireless communication technology may include one of near field communication (NFC), radio frequency identification (RFID), ultra-wideband (UWB), wireless fidelity (WiFi), and Bluetooth, According to various embodiments of the present invention, the first image may further include wireless recognition information on the digital tag recognized when the terminal that photographs the first image photographs the first image. According to various embodiments of the present invention, the second image may further include wireless recognition information on the digital tag recognized when the terminal that photographs the second image photographs the second image.

Users may confirm the serial number of the original PPL product used during actual photographing in the PPL scene being reproduced on the smart image device 100 through the first image output to the user terminal 200, and confirm that the original PPL product is actually used during photographing through the second image. It may be confirmed in the first image that the digital tag along with the serial number is attached to the original PPL product, and it may be confirmed that the product with the serial number of the first image is actually used during photographing based on the fact that the first image and the second image include the same digital tag information. In addition, users may confirm that the first image and the second image are images photographed at the actual photographing site based on the fact that the first image and the second image include the location tag information on the same area and the photographing time tag information in the adjacent time zone on the same date.

Therefore, the uniqueness of the original PPL product actually used in the media content may be verified through the first image and the second image.

Users may purchase a true PPL product by proceeding with the purchase procedure for a product corresponding to the same manufacturer and model as the original PPL product.

In addition, users may purchase the original PPL product itself and verify ownership of the original PPL product using the blockchain technology such as the NFT.

In addition, according to various embodiments of the present invention, the block data uploaded to the blockchain network corresponds to the NFT, the NFT includes information on the ownership and sales history of the NFT, the ownership of the NFT may be set to belong to the same person as the ownership of the original PPL product, and when the original PPL product is sold, the NFT may also be set to be sold to the same person along with the original PPL product.

Referring to FIG. 5, a method of performing verification of value for a unique PPL product used in the photographing using a blockchain technology such as NFT is disclosed.

The information that may verify that the PPL product is the original PPL product actually used in the photographing may be registered in the blockchain network using the technology such as the NFT or in a server database of a PPL management company.

After the original PPL product is sold through an auction, etc., by updating information on a person who newly acquires ownership with the transaction history in the NFT for the information that may verify that the PPL product is the original PPL product actually used in the photographing, objective ownership and value may be verified.

Figure 6:
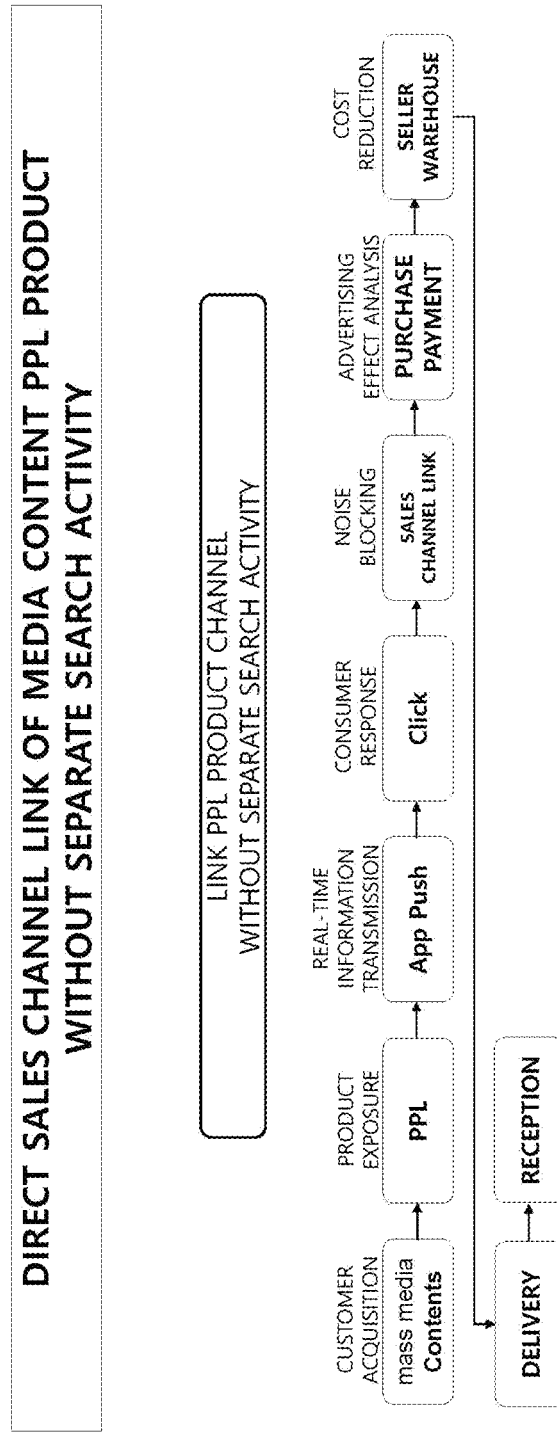
FIG. 6 is a diagram illustrating an example of a method of transmitting information on a PPL product to a user terminal and providing a purchase of the PPL product in synchronization with a playback time of media content in a communication system according to various embodiments of the present invention.

FIG. 6 is a diagram illustrating an example of a method of transmitting information on a PPL product to a user terminal and providing a purchase of the PPL product in synchronization with a playback time of media content in a communication system according to various embodiments of the present invention.

Referring to FIG. 6, it is possible to acquire users who are exposed to indirect advertising, that is, PPL, to viewers through the media content as customers.

By naturally exposing the PPL product to the viewers of the media content through the PPL, it is possible to stimulate their desire to purchase.

When the PPL scene where the PPL product appears in the media content is reproduced and the viewers of the media content are exposed to the PPL, the PPL information is transmitted from the server to the user terminal and the PPL information pops up on the user terminal, so viewers may be encouraged to purchase the PPL product as soon as they have the desire to purchase.

By providing a true manufacturer's sales channel link for the PPL product in the PPL information that pops up on the user terminal, noise to users being passed over to sellers of imitation products can be blocked. Users may be directly linked to the sales channel of the PPL product without performing a separate search for the PPL product that they feel the desire to purchase.

Objective statistics on the advertising effectiveness of PPL may be generated by generating statistics on the number of views of the PPL information that pops up on the user terminal and statistics on the number of actual purchases after viewing the PPL information.

Since the PPL information allows PPL products to be directly sold, delivered, and received from a seller's warehouse of a true manufacturer to a user, an intermediate distribution process may be eliminated, so intermediate costs such as logistics and distribution may be reduced.

Figure 7:
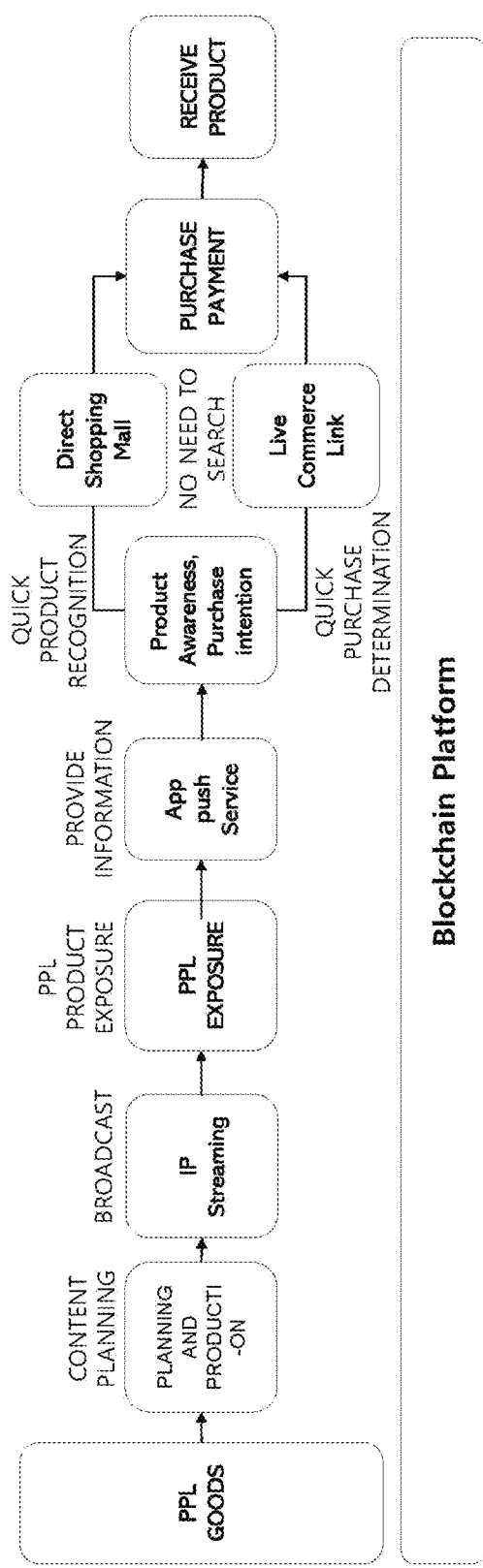
FIG. 7 is a diagram illustrating an example of a method of transmitting information on a PPL product to a user terminal and providing a purchase of the PPL product in synchronization with a playback time of media content in a communication system according to various embodiments of the present invention.

FIG. 7 is a diagram illustrating an example of a method of transmitting information on a PPL product to a user terminal and providing a purchase of the PPL product in synchronization with a playback time of media content in a communication system according to various embodiments of the present invention.

After a PPL product is defined and media content is planned, the media content may be provided to a user, the users may be exposed to the PPL by viewing the media content, information on the PPL product may be provided from a PPL service providing server to a user terminal, the users may use the information on the PPL product to move to a sales channel link of a true manufacturer of the PPL product or move to an advertising channel link such as live commerce for the PPL product, an the users may easily perform purchase and payment for a truly PPL product using the user terminal and receive the PPL product.

It is possible to verify to the users that the PPL product is the true PPL product that is actually used in photographing the media content using the technologies such as the blockchain network.

Users may not be exposed to information on imitation products or similar products by moving the link to the sales channel, i.e., shopping mall, live commerce channel, etc., of the advertiser without performing a separate search for the planned PPL product.

Uniform resource locator (URL) information or the like on the sales channel of the PPL product may be provided to users through the block data on the blockchain network for the product information.

Figure 8:
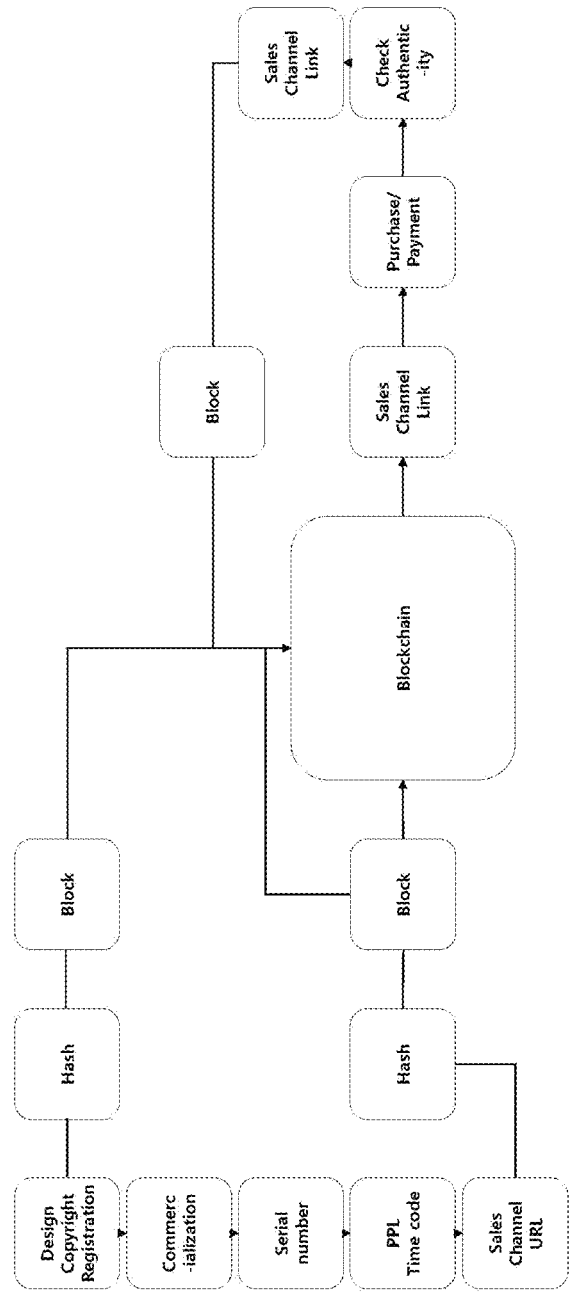
FIG. 8 is a diagram illustrating an example of a method of verifying uniqueness of an original PPL product, transmitting information on a PPL product, and providing a purchase of the PPL product in synchronization with a playback time of media content in a communication system according to various embodiments of the present invention.

FIG. 8 is a diagram illustrating an example of a method of verifying uniqueness of an original PPL product, transmitting information on a PPL product, and providing a purchase of the PPL product in synchronization with a playback time of media content in a communication system according to various embodiments of the present invention.

By sharing the design or the like of the original PPL product as the block data along with time stamping information from the product design production stage through the blockchain network, it is possible to verify that the design of the original PPL product is unique in time.

After the original PPL product is commercialized, when the image that may verify the information on the original PPL product photographed at the time of the media content production, for example, the image containing the serial number of the original PPL product, the digital tag information, the image worn by the actor, the location information of the photographing site, and the information on the date and time of photographing are shared with the blockchain node as the digital asset using the blockchain and NFT technology, the uniqueness of the original PPL product may be verified without the possibility of forgery or falsification.

A PPL time code may be generated for the time when the PPL scene is reproduced on the media content, and generated as the block data along with the URL of the sales channel and shared on the blockchain network.

The node such as the user terminal that receives the block data through the blockchain network may obtain information on the original PPL product, time information on the PPL scene, and sales channel link URL information on the PPL product from the block data.

The user terminal may move the link to the sales channel for the PPL product and perform the purchase and payment for the PPL product from the true manufacturer/seller while confirming that the PPL product is the true product of the same manufacturer/model as the PPL product used in the actual photographing.

Figure 9:
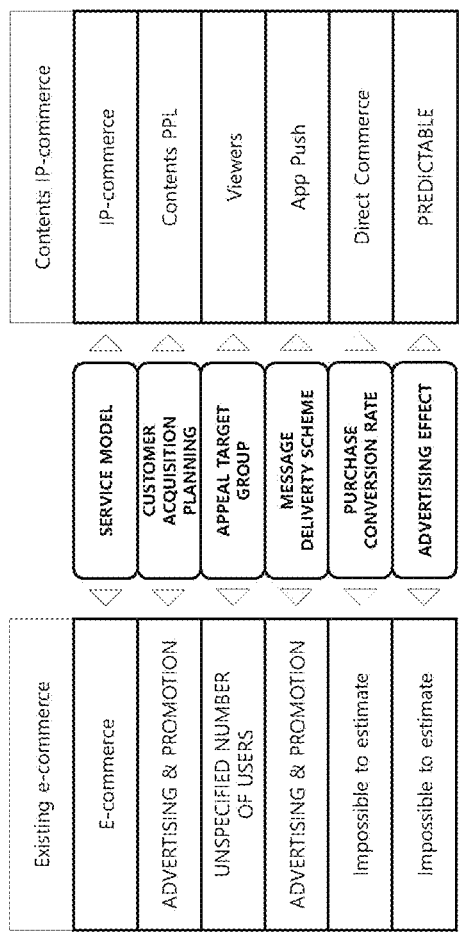
FIG. 9 is a diagram illustrating a comparative example of conventional Internet-based e-commerce and IP-commerce that verifies the uniqueness of the original PPL product.

FIG. 9 is a diagram illustrating a comparative example of conventional Internet-based e-commerce and IP-commerce that verifies the uniqueness of the original PPL product.

The conventional Internet-based e-commerce uses advertising and promotion for an unspecified number of users to acquire customers, and has difficulty determining the number of users exposed to the advertising and promotion who actually make the purchase, making it difficult to objectively measure the actual effect of advertising.

Intellectual property (IP)-commerce proposed in various embodiments of the present invention may propose the PPL in the media content to acquire customers, set a target group as the viewer of the media content, deliver advertising messages through an app push through the user terminal during the reproduction of the media content, increase a purchase conversion rate by being directly linked to the purchase link after pushing the app, and objectively measure the advertising effect by calculating accurate statistics on the number exposed to the PPL, the number of views with interest among the number exposed to the PPL, and the number of actual purchases.

Figure 10:
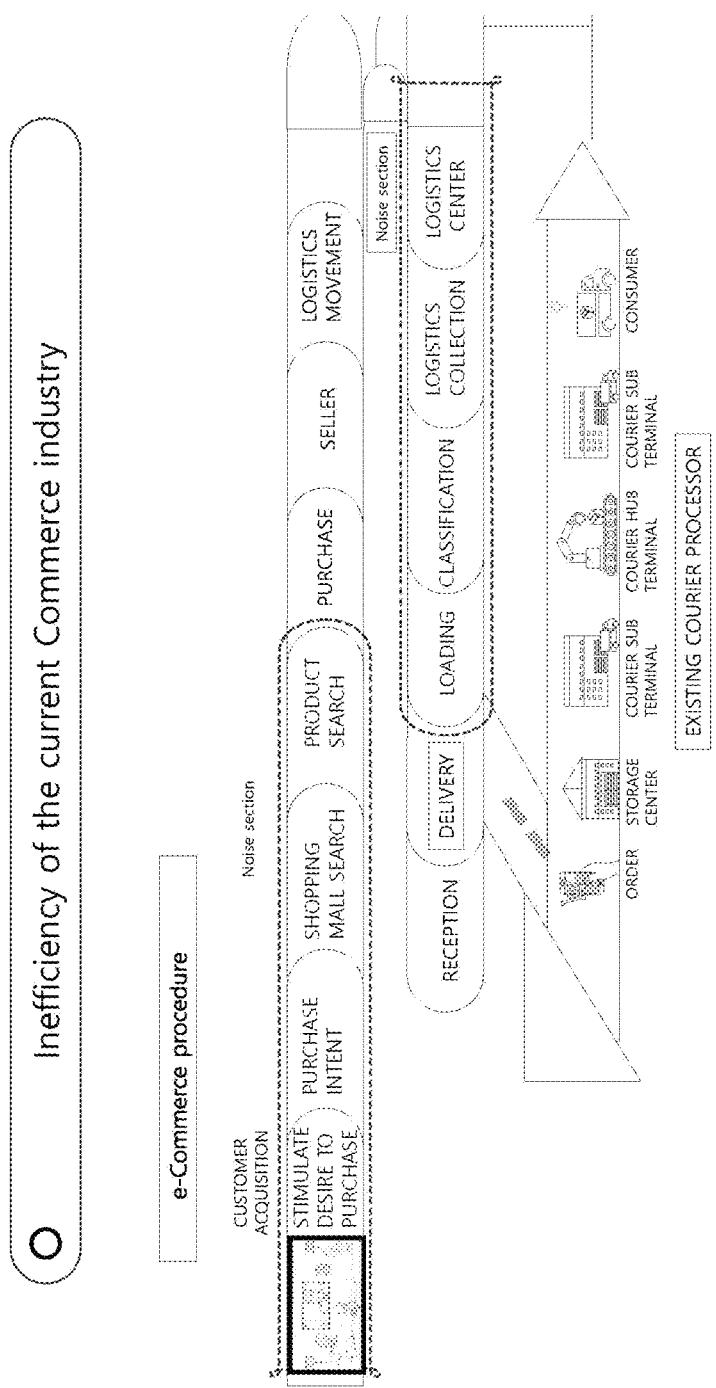
FIG. 10 is a diagram illustrating an example of a process from PPL advertising on media content to purchase according to the conventional Internet-based e-commerce.

FIG. 10 is a diagram illustrating an example of a process from PPL advertising on media content to purchase according to the conventional Internet-based e-commerce.

Referring to FIG. 10, after the e-commerce stimulates viewers' desire to purchase through direct advertising or indirect advertising through video media such as TV, interested viewers directly search for detailed information and sales channels on the advertised product and perform purchases through channels selected from among numerous Internet sales channels provided in search results.

A logistics request to a logistics center is performed by the seller of the channel through which the purchase is performed, and courier delivery is performed through the logistics center to deliver products to users.

Figure 11:
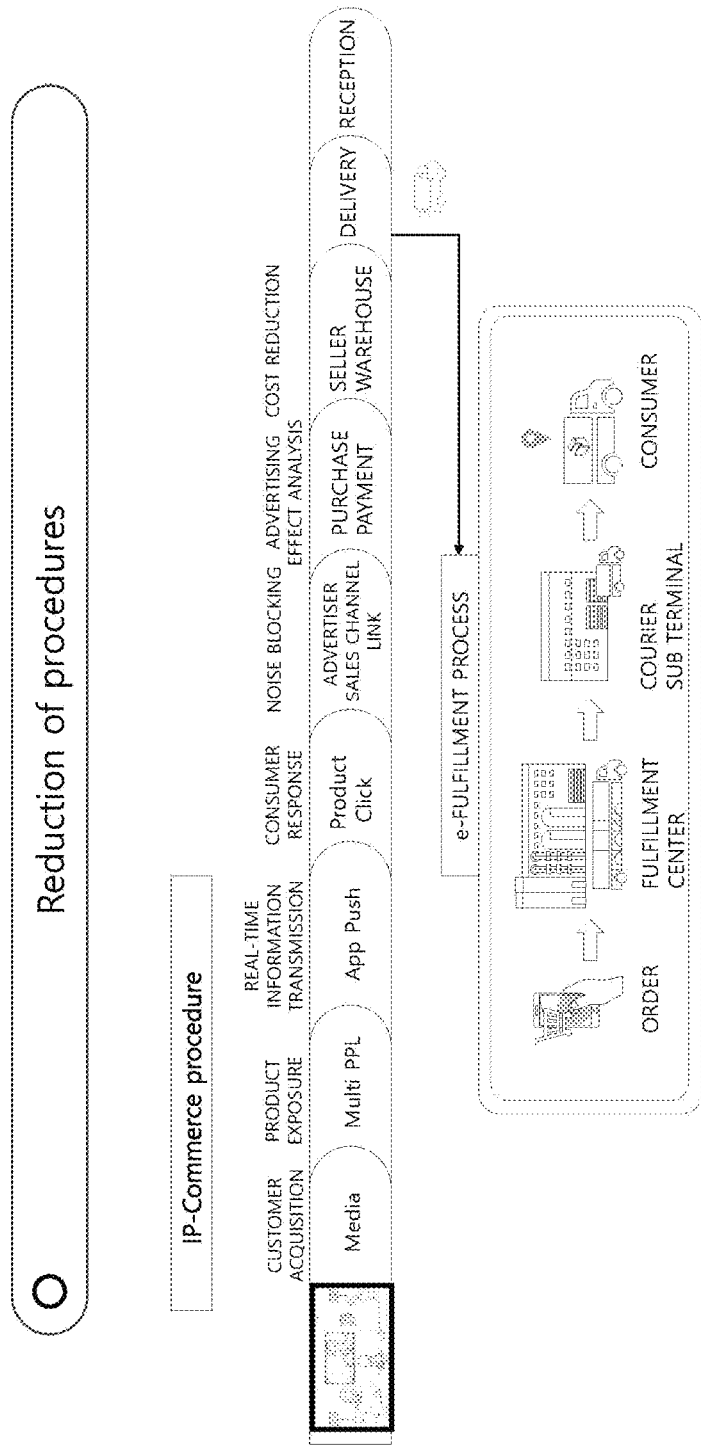
FIG. 11 is a diagram illustrating an example of a process from PPL advertising on media content to purchase according to the IP-commerce according to various embodiments of the present invention.

FIG. 11 is a diagram illustrating an example of a process from PPL advertising on media content to purchase according to the IP-commerce according to various embodiments of the present invention.

Referring to FIG. 11, the IP-commerce proposed in various embodiments of the present invention may use PPL in media content reproduced through smart television, etc., to provide a plurality of PPL products within a single scene, provide app push information to the user terminal to provide information on the plurality of PPL products within the single scene, provides a link connection to an actual advertiser's sales channel for the PPL products according to a user's response, collect statistics on the actual number of purchases performed by users to objectively analyze advertising effect, directly deliver products from a warehouse of the actual advertiser's sales channel to eliminate an intermediate distribution logistics process, and allow true PPL products to be delivered to users through a simple process.

Figure 12:
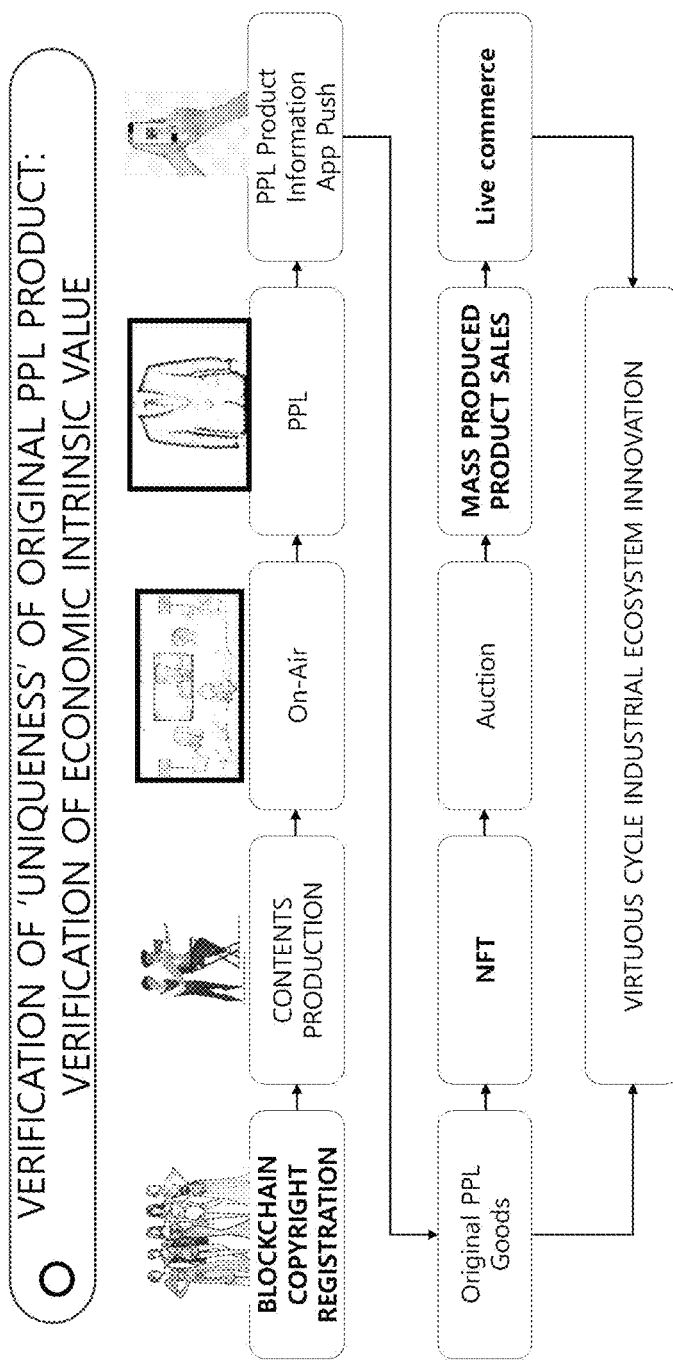
FIG. 12 is a diagram illustrating an example of an effect obtainable by verifying the uniqueness of the original PPL product in the communication system according to various embodiments of the present invention.

FIG. 12 is a diagram illustrating an example of an effect obtainable by verifying the uniqueness of the original PPL product in the communication system according to various embodiments of the present invention.

By sharing the design or the like of the original PPL product as the block data along with time stamping information from the product design production stage through the blockchain network, it is possible to verify that the design of the original PPL product is unique in time.

After the original PPL product is commercialized, when the image that may verify the information on the original PPL product photographed at the time of the media content production, for example, the image containing the serial number of the original PPL product, the digital tag information, the image worn by the actor, the location information of the photographing site, and the information on the date and time of photographing are shared with the blockchain node as the digital asset using the blockchain and NFT technology, the uniqueness of the original PPL product may be verified without the possibility of forgery or falsification.

A PPL time code may be generated for the time when the PPL scene is reproduced on the media content, and generated as the block data along with the URL of the sales channel and shared on the blockchain network.

The node such as the user terminal that receives the block data through the blockchain network may obtain information on the original PPL product, time information on the PPL scene, and sales channel link URL information on the PPL product from the block data.

The user terminal may move the link to the sales channel for the PPL product and perform the purchase and payment for the PPL product from the true manufacturer/seller while confirming that the PPL product is the true product of the same manufacturer/model as the PPL product used in the actual photographing.

The information that may verify that the PPL product is the original PPL product actually used in the photographing may be registered in the blockchain network using the technology such as the NFT or in a server database of a PPL management company.

It is possible to verify to the users that the PPL product is the true PPL product that is actually used in photographing the media content using the technologies such as the blockchain network.

Users may not be exposed to information on imitation products or similar products by moving the link to the sales channel, i.e., shopping mall, live commerce channel, etc., of the advertiser without performing a separate search for the planned PPL product.

After the original PPL product is sold through an auction, etc., by updating information on a person who newly acquires ownership with the transaction history in the NFT for the information that may verify that the PPL product is the original PPL product actually used in the photographing, objective ownership and value may be verified.

In addition, the mass-produced PPL products of the same manufacturer/model as the original PPL product may be directly sold to users while verifying that the mass-produced PPL products are true PPL products.

Accordingly, it is possible to lead to virtuous industrial ecosystem innovation in the design, advertising, distribution, and media industries.

Figure 13:
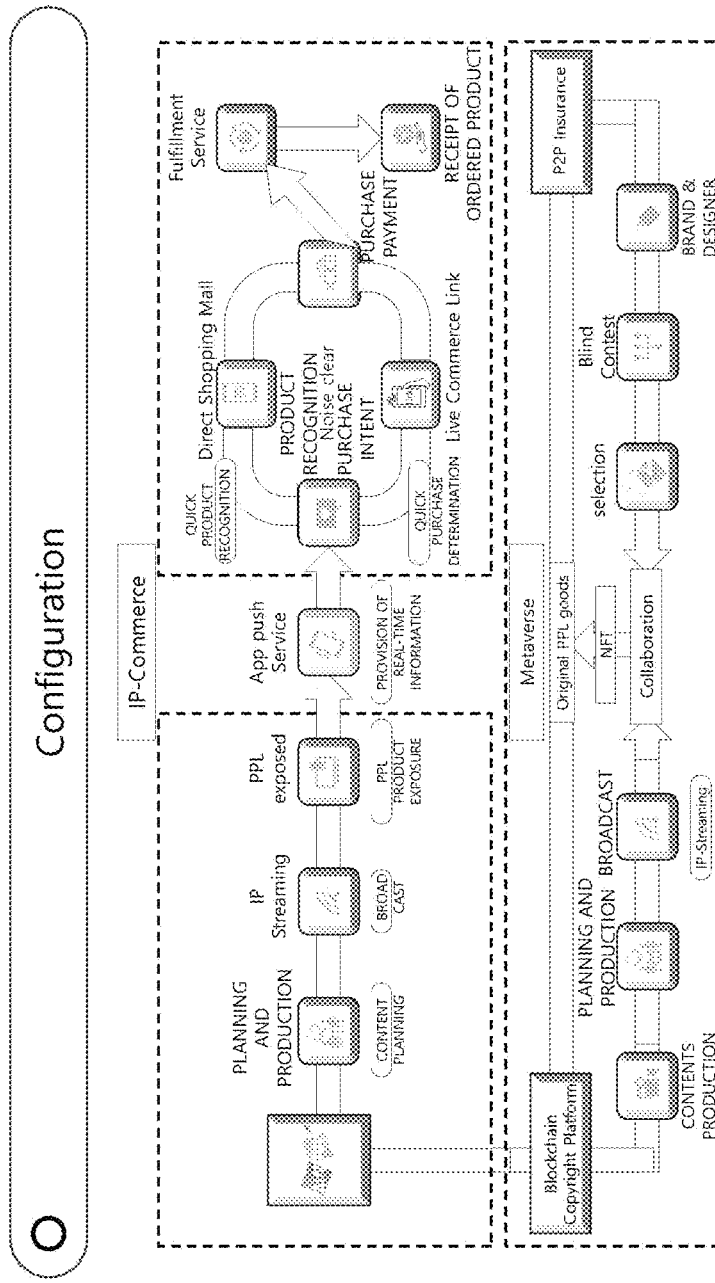
FIG. 13 is a diagram illustrating an example of a method of verifying uniqueness of an original PPL product, transmitting information on a PPL product, and providing a purchase of the PPL product in synchronization with a playback time of media content in a communication system according to various embodiments of the present invention.

FIG. 13 is a diagram illustrating an example of a method of verifying uniqueness of an original PPL product, transmitting information on a PPL product, and providing a purchase of the PPL product in synchronization with a playback time of media content in a communication system according to various embodiments of the present invention.

The PPL advertiser may obtain specific information on PPL products used in media content. For example, information such as a specific playback time of the PPL scene in which the PPL products appears in the media content, information on the media content in which the PPL scene is inserted, information on a platform on which the media content is provided, manufacturer/model information on the PPL product, and sales channel information on the PPL products may be known.

According to an embodiment, the PPL advertiser server may provide the specific information on the PPL product to the PPL server in a manner that the PPL advertiser server uploads the blockchain network in the form of the block data to the blockchain network and then the PPL server receives the corresponding block data from the blockchain network. Alternatively, the PPL advertiser server may directly provide the specific information on the PPL product to the PPL server through a communication network 700.

By sharing the design or the like of the original PPL product as the block data along with time stamping information from the product design production stage through the blockchain network, it is possible to verify that the design of the original PPL product is unique in time. Media content producers such as entertainment companies may secure objective grounds that may claim original creatorship by sharing the design creation process of the PPL products as the block data along with time stamping information while creating the unique designs for the PPL products to be used in the PPL from the production stage of the media content. In addition, after the media content is released to general viewers through the platform, the uniqueness of the PPL product actually used during the photographing may be verified through the blockchain and the sales information on the PPL product may be provided. In addition, the statistics on the number of actual purchases may be objectively secured, and thus, the reasonable compensation may be provided to companies related to the PPL products, such as brand companies or designers in the fashion industry, based on objective grounds. In addition, it is possible for a true creator/manufacturer to produce and distribute related products by linking a Metaverse platform or the like to the design and original PPL products that have verified the uniqueness using the blockchain.

After the original PPL product is commercialized, when the image that may verify the information on the original PPL product photographed at the time of the media content production, for example, the image containing the serial number of the original PPL product, the digital tag information, the image worn by the actor, the location information of the photographing site, and the information on the date and time of photographing are shared with the blockchain node as the digital asset using the blockchain and NFT technology, the uniqueness of the original PPL product may be verified without the possibility of forgery or falsification.

A PPL time code may be generated for the time when the PPL scene is reproduced on the media content, and generated as the block data along with the URL of the sales channel and shared on the blockchain network.

The PPL service providing server may provide the information on the plurality of PPL products within the single scene by providing the app push information to the user terminal of the user viewing the media content through the smart television, etc., and provide the link connection to the actual advertiser's sales channel for the PPL products according to the user's response.

The PPL service providing server may provide the user terminal with the link connection to the advertiser, that is, the sales channel of the true manufacturer such as a direct sales channel or a live commerce channel linked to the advertiser. The user terminal may use the information on the PPL product to move to the sales channel link of the true manufacturer of the PPL product or move to the advertising channel link such as the live commerce for the PPL product. Users may easily perform the purchase and payment for the PPL products and receive the PPL products using the user terminal while viewing the media content.

The link connection may be provided to the actual advertiser's sales channel for the PPL products according to the user's response to the app push, the advertising effect may be objectively analyzed by collecting the statistics on the actual number of purchases performed by users, the delivery may be directly performed from the warehouse of the actual advertiser's sales channel to eliminate the intermediate distribution logistics process, and the true PPL products may be delivered to the users through the simple procedure.

Figure 14:
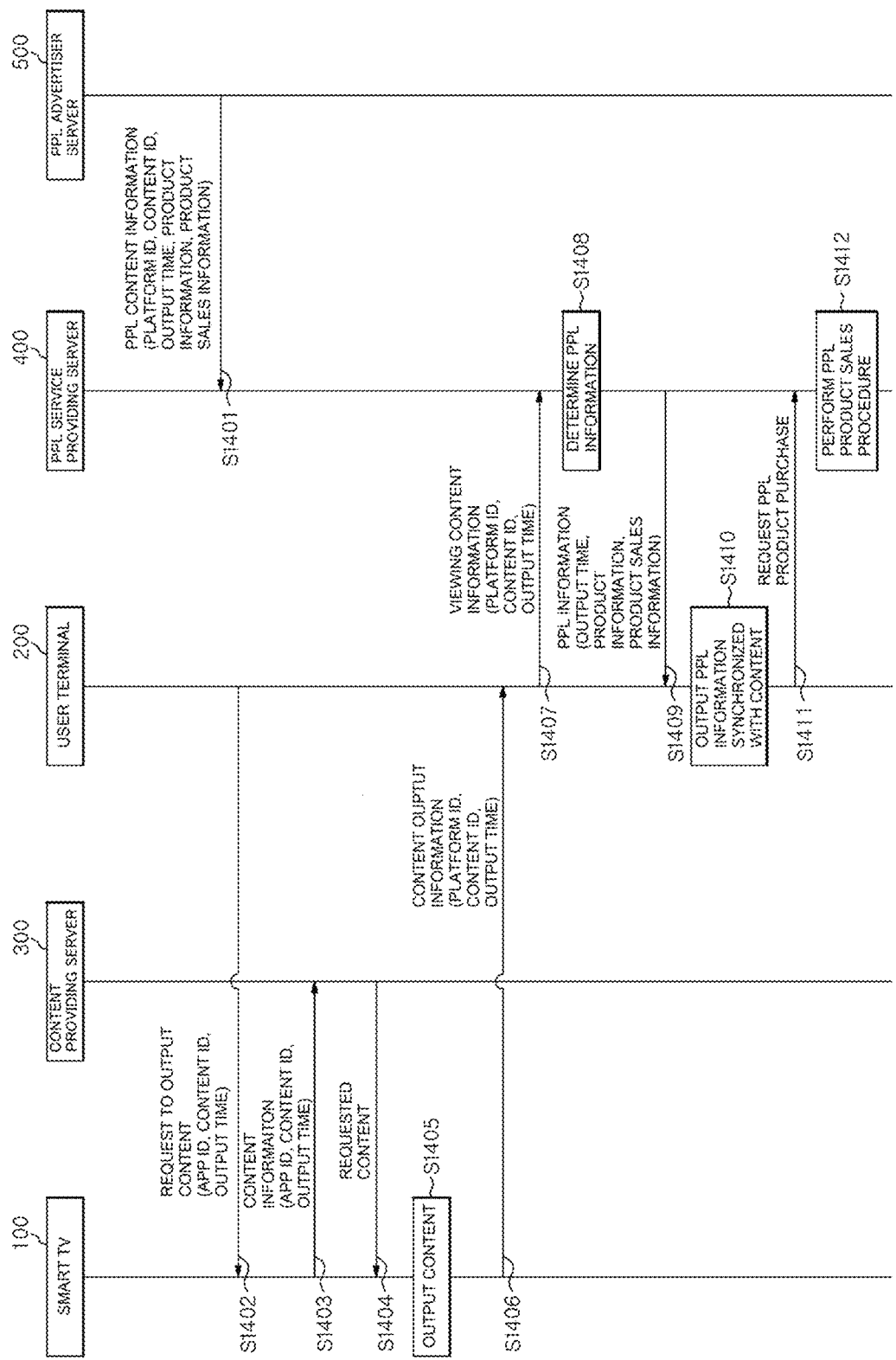
FIG. 14 is a signal flowchart of a method for providing information on a plurality of PPL products in synchronization with the media being reproduced while verifying the uniqueness of the original PPL product in the communication system according to various embodiments of the present invention.

FIG. 14 is a signal flowchart of a method for providing information on a plurality of PPL products in synchronization with the media being reproduced while verifying the uniqueness of the original PPL product in the communication system according to various embodiments of the present invention.

In operation S1401, the service providing server, that is, the PPL service providing server 400, receives a plurality of pieces of first PPL information from the PPL advertiser server 500. Alternatively, although not illustrated in FIG. 14, the PPL service providing server 400 receives, from the content providing server 300, the plurality of pieces of first PPL information transmitted from the PPL advertiser server 500 to the content providing server 300. Each of the plurality of pieces of first PPL information includes manufacturer and product model information on the first PPL product, first content identification information on the first content in which the first PPL product appears, first platform identification information on the first platform on which the first content is provided, and first playback time information at which the first PPL product appears within the first content.

According to various embodiments of the present invention, each of the plurality of pieces of first PPL information include the first image photographed during the production of the first content for the PPL scene in which the actor and the first PPL product appear among the first content and the second image photographed at the production site of the content being viewed for the serial number of the original PPL product photographed along with the actor in the PPL scene, in which the first image and the second image may include the location tag information on the same area and the photographing time tag information in the adjacent time zone on the same date. According to various embodiments of the present invention, the second image includes the image of the digital tag combined with the original PPL product along with the image of the serial number, and the digital tag is based on short-range wireless communication technology that includes one of NFC, RFID, UWB, WiFi, and Bluetooth, in which the first image may further include wireless recognition information on the digital tag recognized when the first image is photographed by the terminal that photographs the first image, and the second image may further include the wireless recognition information on the digital tag recognized when the second image is photographed by the terminal that photographs the second image.

According to various embodiments of the present invention, the process of receiving the plurality of pieces of first PPL information from the PPL advertiser server 500 in operation S1401 may include a process of receiving, by the PPL service providing server 400, the plurality of pieces of first PPL information from the PPL advertiser server 500 through the wired or wireless communication. Alternatively, although not illustrated in FIG. 14, the process of receiving, by the PPL service providing server 400, the plurality of pieces of first PPL information transmitted from the PPL advertiser server 500 to the content providing server 300 from the content providing server 300 in operation S1401 may include a process of directly receiving, by the PPL service providing server 400, the plurality of pieces of first PPL information from the content providing server 300 through the wired or wireless communication network 700.

According to various embodiments of the present invention, the process of receiving the plurality of pieces of first PPL information from the PPL advertiser server 500 in operation S1401 may include a process of receiving, by the PPL service providing server 400, the plurality of pieces of first PPL information uploaded to the blockchain network in the form of the block data through the blockchain network. Alternatively, although not illustrated in FIG. 14, the process of receiving, by the PPL service providing server 400, the plurality of pieces of first PPL information transmitted from the PPL advertiser server 500 to the content providing server 300 from the content providing server 300 in operation S1401 may include a process of receiving, by the PPL service providing server 400, the plurality of pieces of first PPL information uploaded by the content providing server 300 in the form of the block data to the blockchain network through the blockchain network.

According to various embodiments of the present invention, the block data uploaded to the blockchain network corresponds to the NFT, the NFT includes information on the ownership and sales history of the NFT, the ownership of the NFT may be set to belong to the same person as the ownership of the original PPL product, and when the original PPL product is sold, the NFT may also be set to be sold to the same person along with the original PPL product.

In operation S1402, the user terminal 200 transmits a control signal for a content output request to the smart image device, for example, the smart television 100. The content output request may include the application identification (ID) information for the platform on which the media content is provided, the ID information of the media content requested within the corresponding platform application, and the information on the desired playback time of the corresponding media content, i.e., the desired output time. For example, the user terminal 200 in the form of the smartphone may use applications such as Google's Chromecast and YouTube to transmit the control message requesting reproduction from a specific scene for specific media content within the platform application, such as Netflix or YouTube, to the smart television 100. Alternatively, the user terminal 200 in the form of the smartphone may transmit the control message requesting reproduction of content currently being broadcast for a specific channel among a plurality of channels supported by IPTV to the smart television 100 using a remote control application. Since the user terminal 200 directly controls the reproduction of the media content on the smart television 100, the user terminal 200 may know the platform information on the media content, the content information within the platform, and the current playback time information within the content that are being output from the smart television 100.

In operation S1403, the smart image device 100 requests content from the content providing server 300, for example, a Netflix server, a YouTube server, an IPTV server, or another media content providing server based on the control message received from the user terminal 200.

In operation S1404, the smart image device 100 receives data of the requested content from the content providing server 300.

In operation S1405, the smart image device 100 outputs, that is, reproduces the media content received from the content providing server 300.

In operation S1406, the smart image device 100 transmits the content output information on the media content being reproduced, for example, the platform identification information on the media content being reproduced, the identification information within the platform of the media content being reproduced, and the output time information on the media content being reproduced to the user terminal 200. The content output information includes the media content being reproduced on the smart image device 100, that is, second platform identification information on a platform of second content that the user is viewing, second content identification information on the second content, and a second playback time of the second content at the time when the user terminal 200 transmits the viewing content information.

In operation S1407, the PPL service providing server 400 receives the viewing content information from the user terminal 200 through the transceiver The viewing content information includes the media content being reproduced on the smart image device 100, that is, the second platform identification information on the platform of second content that the user is viewing, the second content identification information on the second content, and the second playback time of the second content at the time when the user terminal 200 transmits the viewing content information.

In operation S1408, the PPL service providing server 400 determines the second PPL information by the processor with the second platform identification information among the plurality of pieces of first PPL information received by the PPL service providing server 400 from the PPL advertiser server 500 and the first PPL information corresponding to the second content identification information. In addition, the PPL service providing server 400 determines the current playback time of the second content by the processor with the sum of the time elapsed from the time of receiving the viewing content information and the second playback time.

In operation S1409, the PPL service providing server 400 transmits the second PPL information to the user terminal 200 at the time when the current playback time corresponds to the first playback time information on the second content through the transceiver.

According to various embodiments of the present invention, the second PPL information may include the first image photographed during the production of the second content for the PPL scene in which the actor and the second PPL product appear among the second content and the second image photographed at the production site of the content being viewed for the serial number of the original PPL product photographed along with the actor in the PPL scene, in which the first image and the second image may include the location tag information on the same area and the photographing time tag information in the adjacent time zone on the same date. According to various embodiments of the present invention, the second image may include an image of a digital tag coupled to the original PPL product along with the image of the serial number, and the digital tag is based on a short-range wireless communication technology, and the short-range wireless communication technology may include one of NFC, RFID, UWB, WiFi, and Bluetooth. According to various embodiments of the present invention, the first image may further include wireless recognition information on the digital tag recognized when the terminal that photographs the first image photographs the first image. According to various embodiments of the present invention, the second image may further include the wireless recognition information on the digital tag recognized when the terminal that photographs the second image photographs the second image.

In operation S1410, the user terminal 200 outputs the information on the PPL product synced to the media content being reproduced on the smart image device 100 based on the second PPL information received from the PPL service providing server 400.

According to various embodiments of the present invention, the information on the PPL product that the user terminal 200 outputs may include the information on the manufacturer and product model of the PPL product. According to various embodiments of the present invention, the information on the PPL product that the user terminal 200 outputs may include the first image photographed during the production of the media content for the PPL scene in which the actor and the PPL product appears in the media content being reproduced on the smart image device 100 and the second image photographed at the production site of the media content being reproduced for the serial number of the original PPL product photographed with the actor in the PPL scene, in which the first image and the second image may include the location tag information on the same area and the photographing time tag information in the adjacent time zone on the same date. According to various embodiments of the present invention, the second image may include the image of the digital tag coupled to the original PPL product along with the image of the serial number, and the digital tag is based on the short-range wireless communication technology, and the short-range wireless communication technology may include one of NFC, RFID, UWB, WiFi, and Bluetooth, According to various embodiments of the present invention, the first image may further include the wireless recognition information on the digital tag recognized when the terminal that photographs the first image photographs the first image. According to various embodiments of the present invention, the second image may further include the wireless recognition information on the digital tag recognized when the terminal that photographs the second image photographs the second image.

Users may confirm the serial number of the original PPL product used during the actual photographing in the PPL scene being reproduced on the smart image device 100 through the first image output to the user terminal 200, and confirm that the original PPL product is actually used during the photographing through the second image. It may be confirmed in the first image that the digital tag along with the serial number is attached to the original PPL product, and it may be confirmed that the product with the serial number of the first image is actually used during the photographing based on the fact that the first image and the second image include the same digital tag information. In addition, users may confirm that the first image and the second image are the images photographed at the actual photographing site based on the fact that the first image and the second image include the location tag information on the same area and the photographing time tag information in the adjacent time zone on the same date.

Therefore, the uniqueness of the original PPL product actually used in the media content may be verified through the first image and the second image.

Users may purchase a true PPL product by proceeding with the purchase procedure in operations S1411 and S1412 for the product corresponding to the same manufacturer and model as the original PPL product.

In addition, users may purchase the original PPL product itself and verify ownership of the original PPL product using the blockchain technology such as the NFT.

According to various embodiments of the present invention, the second PPL information may be the information on the plurality of PPL products that appear in the same scene. The user terminal 200 may output the plurality of PPL products that appear in the same scene in the form of a list. Through an embodiment of the present invention, the PPL information on the plurality of PPL products is organized in the form of the list and output from the user terminal 200, so the media content no longer needs to be directed to emphasize the specific PPL product while disrupting the flow of content in order to emphasize the specific PPL. In addition, since users may obtain the information on the PPL product through directing even for PPL products, which have not been greatly emphasized and received attention, in addition to PPL products that are particularly emphasized in directing, multiple product manufacturers may obtain the advertising effect.

In operation S1411, the PPL service providing server 400 receives the purchase request information for the product model information corresponding to the second PPL information from the user terminal 200.

According to various embodiments of the present invention, the PPL service providing server 400 may objectively measure the PPL advertising effect by calculating the statistics of the PPL advertising for which the purchase request have actually been received from the user terminal 200.

In operation S1412, the PPL service providing server 400 performs a sales procedure on the PPL product of the model requested to be purchased. According to an embodiment, the PPL service providing server 400 transmits link connection information to a product advertising site or a product sales site for the product model information corresponding to the second PPL information to the user terminal 200. According to an embodiment, the PPL service providing server 400 may provide the link connection to the sales site for the corresponding PPL product to the user terminal 200, the PPL service providing server 400 may provide the link connection to the advertising site for the corresponding PPL product, for example, the live commerce site to the user terminal 200, or the PPL service providing server 400 may directly provide online sales for the corresponding PPL product to the user terminal 200.

Figure 15:
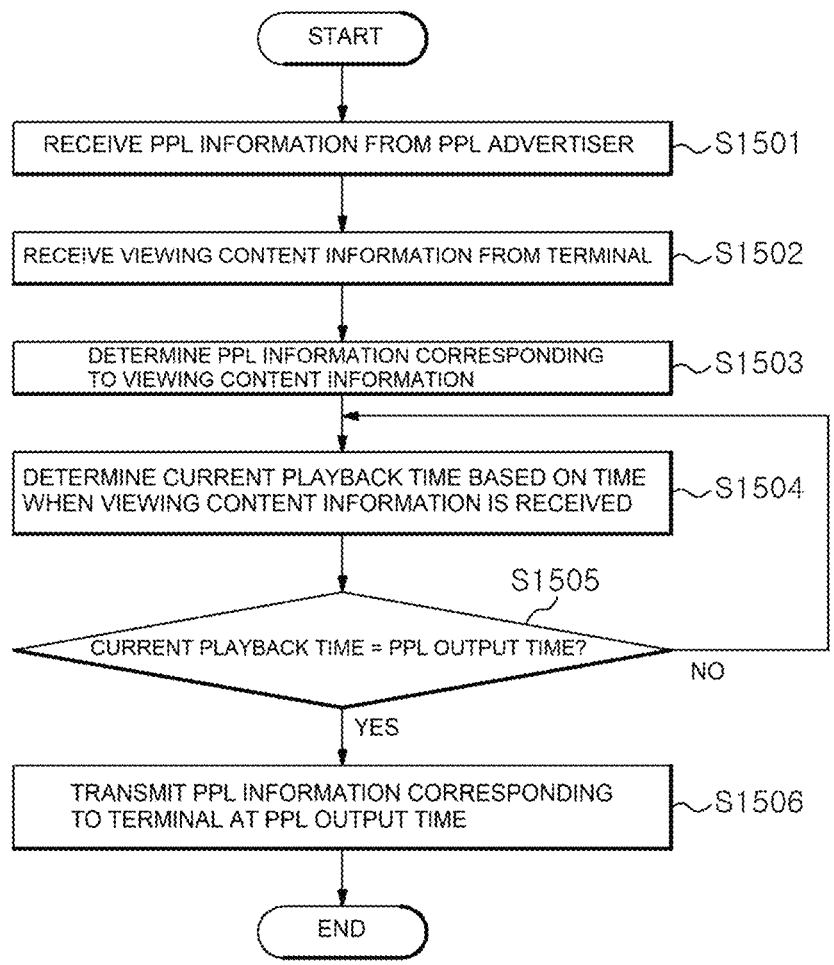
FIG. 15 is a flowchart of a process of operating the PPL service providing server in the communication system according to various embodiments of the present invention.

FIG. 15 is a flowchart of a process of operating the PPL service providing server in the communication system according to various embodiments of the present invention. In the embodiment of FIG. 15, the PPL service providing server, that is, the PPL server includes a transceiver, a memory, and a processor.

Referring to FIG. 15, in operation S1501, the PPL server receives the plurality of pieces of first PPL information from the content server of the first content or the PPL advertiser server of the first PPL product by the transceiver. Each of the plurality of pieces of first PPL information includes the manufacturer and product model information on the first PPL product, the first content identification information on the first content in which the first PPL product appears, the first platform identification information on the first platform on which the first content is provided, and the first playback time information at which the first PPL product appears within the first content.

According to various embodiments of the present invention, each of the plurality of pieces of first PPL information include the first image photographed during the production of the first content for the PPL scene in which the actor and the first PPL product appear among the first content and the second image photographed at the production site of the content being viewed for the serial number of the original PPL product photographed along with the actor in the PPL scene, in which the first image and the second image may include the location tag information on the same area and the photographing time tag information in the adjacent time zone on the same date.

According to various embodiments of the present invention, the second image includes the image of the digital tag combined with the original PPL product along with the image of the serial number, and the digital tag is based on the short-range wireless communication technology that includes one of NFC, RFID, UWB, the WiFi, and Bluetooth, in which the first image may further include the wireless recognition information on the digital tag recognized when the first image is photographed by the terminal that photographs the first image, and the second image may further include the wireless recognition information on the digital tag recognized when the second image is photographed by the terminal that photographs the second image.

According to various embodiments of the present invention, the process of receiving the plurality of pieces of first PPL information from the content server of the first content or the PPL advertiser server of the first PPL product in operation S1501 may include a process of receiving the plurality of pieces of first PPL information from the content server of the first content or the PPL advertiser server of the first PPL product through the wired or wireless communication network 700.

According to various embodiments of the present invention, the process of receiving the plurality of pieces of first PPL information from the content server of the first content or the PPL advertiser server of the first PPL product in operation S1501 may include a process of receiving, by the content server of the first content or the PPL advertiser server of the first PPL product, the plurality of pieces of first PPL information uploaded in the form of the block to the blockchain network through the blockchain network.

According to various embodiments of the present invention, the block uploaded to the blockchain network may correspond to the NFT, the NFT may include the information on the ownership and sales history of the NFT, the ownership of the NFT may be set to belong to the same person as the ownership of the original PPL product, and the NFT may also be set to be sold to the same person along with the original PPL product when the original PPL product is sold.

In operation S1502, the PPL server receives the viewing content information from the terminal through the transceiver. The viewing content information includes the second platform identification information on the platform of the second content being viewed, the second content identification information on the second content, and the second playback time of the second content at the time when the terminal transmits the viewing content information.

In operation S1503, the PPL server determines, by the processor, the second PPL information with the first PPL information corresponding to the second platform identification information and the second content identification information among the plurality of pieces of first PPL information.

In operation S1504, the PPL server determines, by the processor, the current playback time of the second content with the sum of the time elapsed from the time when the viewing content information is received and the second playback time.

In operation S1505, the PPL server determines whether the current playback time corresponds to the first playback time information on the second content by the processor.

In operation S1506, the PPL server transmits, by the transceiver, the second PPL information to the terminal at the time when the current playback time corresponds to the first playback time information on the second content.

According to various embodiments of the present invention, the embodiment of FIG. 15 may further include a process of receiving, by the transceiver, the purchase request information for the product model information corresponding to the second PPL information from the terminal, and a process of transmitting, by the transceiver, the link connection information to the product advertising site or the product sales site for the product model information corresponding to the second PPL information to the terminal.

According to various embodiments of the present invention, the embodiment of FIG. 15 may further include a process of receiving, by the transceiver, the purchase request information on the original PPL product corresponding to the second PPL information from the terminal, and a process of transmitting, by the transceiver, the link connection information to the product advertising site or the product sales site for the product model information corresponding to the second PPL information to the terminal.

According to various embodiments of the present invention, the embodiment of FIG. 15 may further include a process of transmitting, by the transceiver, a request to confirm whether the original PPL product is original based on the serial number and the product model information of the original PPL product to the manufacturer's server, a process of receiving, by the transceiver, a response to confirm whether the original PPL product is original from the manufacturer's server, a process of transmitting, by the transceiver, the original confirmation information of the original PPL product along with the second PPL information to the terminal.

Various embodiments of the present invention provide the PPL service providing server, that is, the PPL server, in the communication system. The PPL server includes the transceiver, the memory, and the processor, and the processor is configured to perform the server operating method according to the embodiment of FIG. 15.

According to various embodiments of the present invention, there is provided a computer program recorded on a computer-readable storage medium. The computer program is configured to perform the operation method of the PPL service providing server, that is, the PPL server according to the embodiment of FIG. 15.

In the case of implementing the embodiment of the present invention using hardware, application specific integrated circuits (ASICs), digital signal processors (DSPs), digital signal processing devices (DSPDs), programmable logic devices (PLDs), field programmable gate arrays (FP- GAs), etc., that are configured to perform the present invention may be provided in the processor of the present invention.

Meanwhile, the above-described method can be written as a program that may be executed on a computer, and can be implemented in a general-purpose digital computer that operates the programs using a computer-readable recording medium. In addition, the structure of data used in the above-described method may be recorded on a computer-readable storage medium through various means. Program storage devices, which may be used to describe a storage device including executable computer codes for performing various methods of the present invention, should not be construed as including transitory objects such as carrier waves or signals The computer-readable recording medium includes storage media such as magnetic storage media (e.g., a read-only memory (ROM), a floppy disk, a hard disk, etc.) and optically readable media (e.g., a compact disc read-only memory (CD-ROM), a digital video disc (DVD), etc.).

In the embodiments described hereinabove, components and features of the present disclosure were combined with each other in a predetermined form. It is to be considered that the respective components or features are selective unless separately explicitly mentioned. The respective components or features may be implemented in a form in which they are not combined with other components or features. In addition, some components and/or features may be combined with each other to configure the embodiment of the present disclosure. A sequence of operations described in the embodiments of the present disclosure may be changed. Some components or features of any embodiment may be included in another embodiment or be replaced by corresponding components or features of another embodiment. It is obvious that claims that do not have an explicitly referred relationship in the claims may be combined with each other to configure an embodiment or be included in new claims by amendment after application.

It will be obvious to those skilled in the art that the present invention may be embodied in other forms without departing from the technical spirit and essential features of the present invention. Accordingly, the above embodiments should be considered in all respects as illustrative rather than restrictive. The scope of the present invention should be determined by reasonable interpretation of the appended claims and all possible changes within the equivalent scope of the present invention.

The present invention relates to a method and apparatus which verify uniqueness of an original product placement (PPL) product and provide the same in synchronization with media reproducing information on a plurality of PPL products in a communication system. More particularly, the present invention relates to a method and apparatus share, on a blockchain network, an image containing digital tag information and a serial number photographed while content is produced so as to verify uniqueness of an original PPL product, transmit, to a terminal of a user, information on a plurality of PPL products in synchronization with the playback time of the content according to a playback time when a PPL product appears, and provide a purchase procedure in a communication system.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of operating a product placement (PPL) server in a communication system, the PPL server including a transceiver, a memory, and a processor, the method comprising:

receiving, by the transceiver, a plurality of pieces of first PPL information, wherein each of the plurality of pieces of first PPL information includes a manufacturer and product model information on a first PPL product, first content identification information on first content in which the first PPL product appears, first platform identification information on a first platform on which the first content is provided, and first playback time information for which the first PPL product appears within the first content, the receiving of the plurality of pieces of first PPL information includes receiving, by a content server of the first content or a PPL advertiser server of the first PPL product, the plurality of pieces of first PPL information uploaded in a block form to the blockchain network through a blockchain network, and the block uploaded to the blockchain network corresponds to a non-fungible token (NFT), the NFT includes information on ownership and sales history of the NFT, ownership of the NFT is set to belong to the same person as ownership of an original PPL product, and the NFT is also set to be sold to the same person along with the original PPL product when the original PPL product is sold;

receiving, by the transceiver, viewing content information from a terminal, wherein the viewing content information includes second platform identification information on a platform of the second content being viewed, second content identification information on the second content, and a second playback time of the second content at a time when the terminal transmits the viewing content information;

determining, by the processor, second PPL information with the first PPL information corresponding to the second platform identification information and the second content identification information among the plurality of pieces of first PPL information;

determining, by the processor, a current playback time of the second content with a sum of a time elapsed from a time when the viewing content information is received and the second playback time; and transmitting, by the transceiver, the second PPL information to the terminal at a time when the current playback time corresponds to the first playback time information on the second content.

2. The method of claim 1, wherein each of the plurality of pieces of first PPL information includes a first image photographed during production of the first content for a PPL scene in which an actor and the first PPL product appear among the first content and a second image photographed at a production site of the content being viewed for a serial number in the original PPL product photographed with the actor in the PPL scene, and the first image and the second image include location tag information on the same area and photographing time tag information in an adjacent time zone on the same date.

3. The method of claim 1, further comprising:

receiving, by the transceiver, purchase request information for the product model information corresponding to the second PPL information from the terminal; and transmitting, by the transceiver, link connection information on a product advertising site or product sales site for the product model information corresponding to the second PPL information to the terminal.

4. The method of claim 2, wherein the second image includes an image of a digital tag coupled to the original PPL product along with an image of the serial number, and the digital tag is based on a short-range wireless communication technology, and the short-range wireless communication technology includes one of near field communication (NFC), radio frequency identification (RFID), ultra-wideband (UWB), wireless fidelity (WiFi), and Bluetooth, the first image further includes wireless recognition information on the digital tag recognized when the first image is photographed by the terminal that photographs the first image, and the second image further includes the wireless recognition information on the digital tag recognized when the second image is photographed by the terminal that photographs the second image.

5. The method of claim 2, further comprising:

receiving, by the transceiver, purchase request information on the original PPL product corresponding to the second PPL information from the terminal; and transmitting, by the transceiver, link connection information on a product advertising site or product sales site for the original PPL product corresponding to the second PPL information to the terminal.

6. The method of claim 2, further comprising:

transmitting, by the transceiver, a request to confirm whether the original PPL product is original based on the serial number and the product model information on the original PPL product to a manufacturer's server;

receiving, by the transceiver, a response confirming whether the original PPL product is original from the manufacturer's server; and transmitting, by the transceiver, original confirmation information on the original PPL product along with the second PPL information to the terminal.

7. A server in a communication system, comprising:

a transceiver;

a memory; and a processor, wherein the memory stores instructions for operations performed by the processor, and the operations include:

receiving, by the transceiver, a plurality of pieces of first PPL information, wherein each of the plurality of pieces of first PPL information includes a manufacturer and product model information on a first PPL product, first content identification information on first content in which the first PPL product appears, first platform identification information on a first platform on which the first content is provided, and first playback time information for which the first PPL product appears within the first content, the receiving of the plurality of pieces of first PPL information includes receiving, by a content server of the first content or a PPL advertiser server of the first PPL product, the plurality of first PPL information uploaded in a form of block to the blockchain network through a blockchain network, and the block uploaded to the blockchain network corresponds to a non-fungible token (NFT), the NFT includes information on ownership and sales history of the NFT, ownership of the NFT is set to belong to the same person as ownership of an original PPL product, and the NFT is also set to be sold to the same person along with the original PPL product when the original PPL product is sold;

receiving, by the transceiver, viewing content information from a terminal, wherein the viewing content information includes second platform identification information on a platform of the second content being viewed, second content identification information on the second content, and a second playback time of the second content at a time when the terminal transmits the viewing content information;

determining, by the processor, second PPL information with the first PPL information corresponding to the second platform identification information and the second content identification information among the plurality of pieces of first PPL information;

determining, by the processor, a current playback time of the second content with a sum of a time elapsed from a time when the viewing content information is received and the second playback time; and transmitting, by the transceiver, the second PPL information to the terminal at a time when the current playback time corresponds to the first playback time information on the second content.

\* \* \* \* \*